United States Patent
Uehlin et al.

(10) Patent No.: US 12,399,076 B2
(45) Date of Patent: Aug. 26, 2025

(54) DIFFERENTIAL PRESSURE SENSOR FOR DETERMINING THE DIFFERENTIAL PRESSURE BETWEEN TWO PRESSURES

(71) Applicant: Endress+Hauser SE+Co. KG, Maulburg (DE)

(72) Inventors: Thomas Uehlin, Schopfheim (DE); Florian Gutmann, Münstertal (DE); Alexander Beck, Berlin (DE); Igor Getman, Lörrach (DE); Benjamin Mack, Lörrach (DE); Michael Noack, Beelitz (DE); Michael Hügel, Offenburg (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 126 days.

(21) Appl. No.: 17/908,646

(22) PCT Filed: Dec. 16, 2020

(86) PCT No.: PCT/EP2020/086461
§ 371 (c)(1),
(2) Date: Sep. 1, 2022

(87) PCT Pub. No.: WO2021/122775
PCT Pub. Date: Jun. 24, 2021

(65) Prior Publication Data
US 2024/0068895 A1    Feb. 29, 2024

(30) Foreign Application Priority Data

Dec. 20, 2019  (DE) .................... 10 2019 135 476.5
Apr. 20, 2020  (DE) .................... 10 2020 110 728.5
Aug. 17, 2020  (DE) .................... 10 2020 121 585.1

(51) Int. Cl.
*G01L 19/06*  (2006.01)
*G01L 13/02*  (2006.01)
*G01L 13/06*  (2006.01)
*G01L 19/14*  (2006.01)

(52) U.S. Cl.
CPC ........ *G01L 19/0618* (2013.01); *G01L 13/026* (2013.01); *G01L 13/06* (2013.01); *G01L 19/141* (2013.01)

(58) Field of Classification Search
CPC ..... G01L 13/02; G01L 13/025; G01L 13/026; G01L 7/08; G01L 19/00496; G01L 19/0618
See application file for complete search history.

(56) References Cited

U.S. PATENT DOCUMENTS 7,624,642 B2 * 12/2009  Romo ................... G01L 19/04
                                                           73/717
10,656,039 B2   5/2020  Hershey et al.
(Continued)

FOREIGN PATENT DOCUMENTS

CN  204043843 U  12/2014
CN  104870961 A   8/2015
(Continued)

*Primary Examiner* — Erika J. Villaluna
(74) *Attorney, Agent, or Firm* — Christopher R. Powers; Endress+Hauser (USA) Holding, Inc.

(57) ABSTRACT

A differential pressure sensor for determining the differential pressure between two pressures includes a converter chamber including a differential pressure measuring cell, and a measuring unit including a main body and a coplanar double-membrane system with two double membranes, each including a separating membrane and an overload membrane with a pressure chamber between the separating membrane and the overload membrane and an additional pressure chamber between the overload membrane and the main body. Each pressure chamber and each additional pressure chamber is paired with at least one capillary connection such that in the event of an overpressure, the overpressure is hydraulically transmitted from the high-pressure side to the low-pressure side via a hydraulic fluid
(Continued)

such that the overload membrane and the separating membrane are deflected, and the hydraulic fluid displaced from the high-pressure side to the additional pressure chamber on the low-pressure side before the overpressure reaches the pressure-sensitive element.

8 Claims, 7 Drawing Sheets

(56) References Cited

U.S. PATENT DOCUMENTS

| | | |
|---|---|---|
| 2002/0017143 A1 | 2/2002 | Burczyk et al. |
| 2008/0245152 A1 | 10/2008 | Louwagie et al. |
| 2009/0078054 A1 | 3/2009 | Romo |
| 2018/0259414 A1 | 9/2018 | Hershey et al. |
| 2018/0364124 A1 | 12/2018 | Strei et al. |

FOREIGN PATENT DOCUMENTS

| | | |
|---|---|---|
| CN | 109141734 A | 1/2019 |
| CN | 110383028 A | 10/2019 |
| CN | 110402378 A | 11/2019 |
| DE | 3222620 A | 8/1983 |
| DE | 3222620 A1 | 8/1983 |
| DE | 102012025070 A1 | 6/2014 |
| JP | 2006300570 A | 11/2006 |
| WO | 2016102121 A1 | 6/2016 |
| WO | 2018165122 A1 | 9/2018 |
| WO | 2018204304 A1 | 11/2018 |

\* cited by examiner

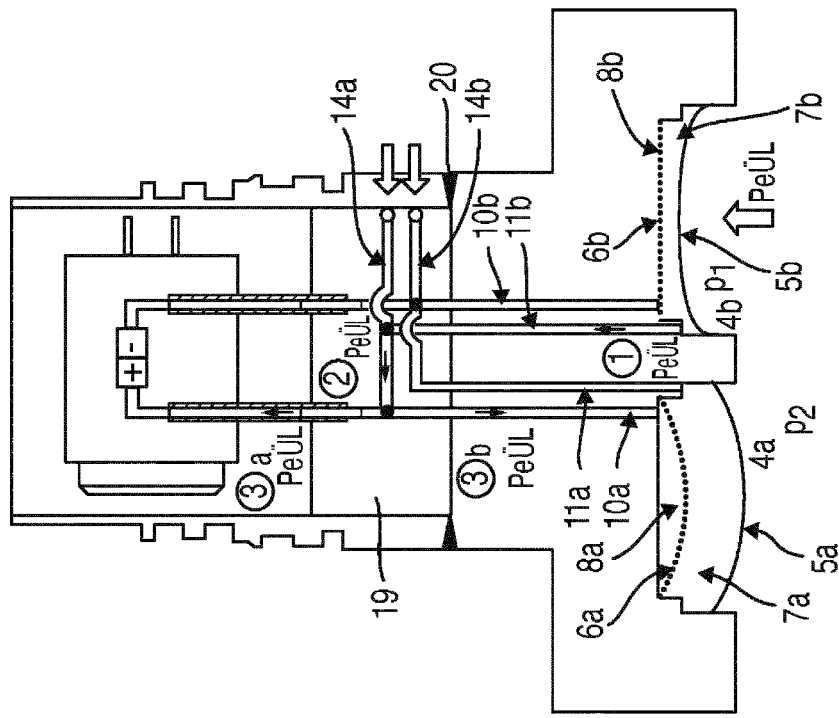
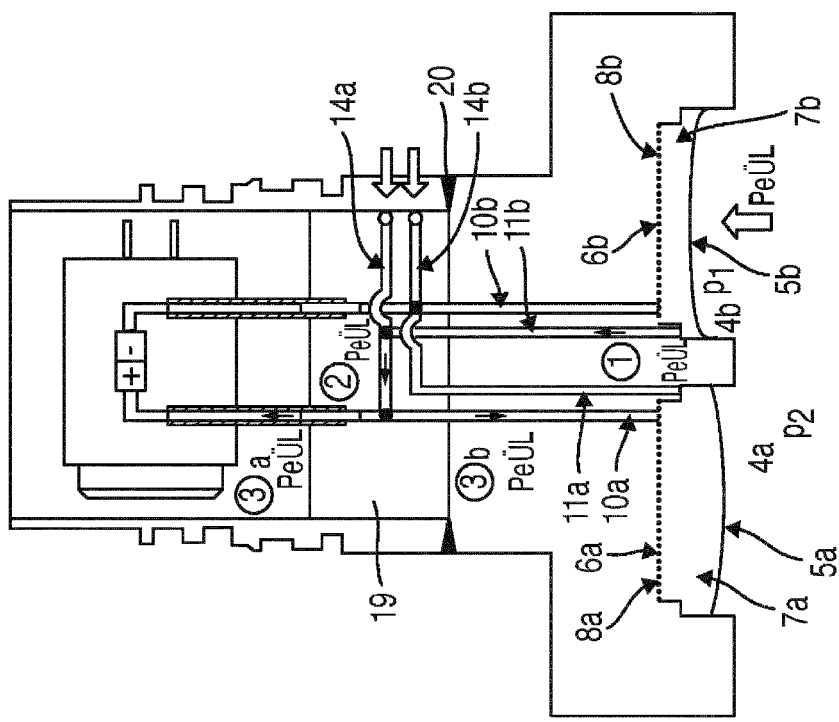

DIFFERENTIAL PRESSURE SENSOR FOR DETERMINING THE DIFFERENTIAL PRESSURE BETWEEN TWO PRESSURES

CROSS-REFERENCE TO RELATED APPLICATIONS

The present application is related to and claims the priority benefit of German Patent Application No. 10 2019 135 476.5, filed on Dec. 20, 2019, German Patent Application No. 10 2020 110 728.5, filed on Apr. 20, 2020, German Patent Application No. 10 2020 121 585.1, filed Aug. 17, 2020, and International Patent Application No. PCT/EP2020/086461, filed Dec. 16, 2020, the entire contents of which are incorporated herein by reference.

TECHNICAL FIELD

Differential pressure measuring devices are used in particular for continuously measuring pressure differences in measurement media, for example in liquids, vapors, gases and dusts. From the differential pressure, for example, the fill level of a filling material in a tank or the flow of a measurement medium through a pipe conduit can be determined.

BACKGROUND

A silicon chip is usually used as the pressure-sensitive element. In order to achieve a good measurement sensitivity, a differential pressure sensor preferably operates in a range close to a critical limit value for the pressure (nominal pressure). If the critical limit value is exceeded, there is a risk of the chip being destroyed. Since silicon chips in particular have a relatively low overload resistance, overload protection is usually assigned to a differential pressure sensor. This is preferably designed such that it impairs the measurement sensitivity and the measurement accuracy of the pressure-sensitive element as little as possible.

DE 3 222 620 A1 discloses a pressure difference measuring device having a pressure sensor means that is protected against overload. The measuring device has a central receiving body, which forms a prechamber in each case on two opposite sides between a membrane bed and a separating membrane. An additional chamber, which is delimited by a preloaded additional membrane, is provided in each case behind the side facing away from the membrane bed in the receiving body. Furthermore, a measuring chamber is located within the receiving body, said measuring chamber being divided into two sub-chambers by the pressure sensor means. Each of the two sub-chambers of the measuring chamber is connected via a respective connection duct to one of the two prechambers. Each of the two connection ducts is connected to one of the two additional chambers via an additional duct.

If the device is exposed to a differential pressure below or within the range of the nominal differential pressure value, this differential pressure of the pressure sensor means is transmitted via the connection ducts. The additional membranes have a small effect, which is negligible in a first approximation. If the pressure difference exceeds the pressure difference nominal value by a predetermined value due to an overload, in the case of the separating membrane on the high-pressure side, the pressure mediator liquid located under it is forced into the prechamber assigned to it. The liquid pressed out passes via the connection duct and the additional duct to the additional membrane on the low-pressure side and causes the latter to lift off. Thus, the liquid pressed out under the separating membrane on the high-pressure side is located under the lifting additional membrane on the low-pressure side in the event of an overload. An overload of the pressure sensor means is therefore avoided. The converter chamber is integrated into the measuring unit in the German patent application.

WO 2018/165122 A1 discloses a differential pressure sensor of coplanar construction, in which the pressure inlets with separating membrane and overload membrane are arranged in one plane, specifically in the end region facing the process, and not on opposite, parallel planes as in the aforementioned German patent application. This is a so-called double membrane system. The advantage of double membrane systems is the significantly smaller oil volume required for hydraulic operation of the differential pressure sensor. In addition, the pressure-loaded central membrane welding can be dispensed with here, so that the measuring unit can be designed in one piece. As in the aforementioned patent application, the overload protection is also arranged in the measuring unit in this known solution, i.e. the intersecting capillaries are located in the measuring unit. The converter chamber is placed directly onto the measuring unit or integrated into the measuring unit.

The known solutions have multiple disadvantages: Since the intersecting hydraulic pressure passages are arranged in the measuring unit, for example in the case of the known coplanar design, externally exposed bores are required for the purpose of oil filling, which bores are closed after filling. The closure regions are potential weak points for corrosion. In addition, the bores are quite long, which has a negative effect on manufacturing costs. Long bores also inevitably require a larger oil volume, which in turn makes the implementation of overload protection in the measuring unit more difficult. Since defined distances between the pressure passages have to be maintained, limits are set to minimize the dimensions of the measuring unit.

U.S. Pat. No. 10,656,039 B2 discloses a differential pressure sensor with two double membranes arranged in a coplanar manner and overload protection. Each double membrane consists of a separating membrane and an adjoining overload membrane. The overload membranes have multiple folds. In the region of the folds, the overload membranes are not in contact with the base body. The lower edges of the folds of the two overload membranes bear against the base body/sensor body under a defined preloading and only lift off from the base body when a pressure/overpressure greater than the defined preloading is applied to one of the separating membranes. The pressure is transmitted via two hydraulic lines, both of which branch off from the region between the overload membrane and the base body.

SUMMARY

The object of the invention is to propose a pressure sensor with overload protection and reduced oil volume. The term "oil volume" is selected here, since the hydraulic transfer fluid is usually an approximately incompressible oil, for example a silicone oil.

The object is achieved by a coplanar differential pressure sensor for determining the differential pressure between two pressures, comprising a measuring unit and a converter chamber, wherein a coplanar double membrane system with two double membranes is provided on or in an end region of the measuring unit facing the process. A differential pressure measuring cell with a pressure-sensitive element is arranged in the converter chamber. The two double membranes each consist of a separating membrane and an overload membrane arranged behind the separating membrane in the direction of action of the pressure, wherein a first pressure chamber is formed between the first separating membrane and the first overload membrane, and a first additional pressure chamber is formed between the first overload membrane and the base body. A second pressure chamber is formed between the second separating membrane and the second overload membrane, and a second additional pressure chamber is formed between the second overload membrane and the base body. A capillary connection is assigned to each of the two pressure chambers. Likewise, at least one capillary connection is assigned to each of the two additional pressure chambers. The capillary connections are designed and connected/coupled in such a way that during normal measuring operation the pressures applied to the separating membranes are transmitted hydraulically to the pressure-sensitive element. In the event of overpressure, the overpressure is transmitted hydraulically from the high-pressure side to the low-pressure side such that the overpressure membrane and the separating membrane are deflected, and a hydraulic fluid displaced from the high-pressure side is received in the additional pressure chamber on the low-pressure side before the overpressure reaches the pressure-sensitive element. A simple construction provides that the base body of the measuring unit is designed in one piece, that is to say monolithically, and is thus extremely simple. Furthermore, it is provided that the measuring unit has a fully symmetrical structure at least as far as the connections/couplings of the capillary connections. In this case, fully symmetrical means that the housing of the measuring unit with the capillary bores has a symmetrical/fully symmetrical structure with respect to a plane running centrally and perpendicularly between the two coplanar double membranes.

The oil demand in the hydraulic system is low due to the small size of the membranes and the additional pressure chambers that are unfilled during normal measuring operation. A cost saving in the measuring unit is achieved in particular by material savings (small dimensions) and simplified production and machining. The capillary connections are preferably produced by drilling or erosion. The filling of the hydraulic system with hydraulic fluid takes place via the measuring unit and/or the converter chamber, depending on the embodiment.

It is preferably provided that the measuring unit and the converter chamber are not only separate components, but that the measuring unit and the converter chamber are also spatially separated or spaced apart from one another. As a result, the measuring unit and the measurement unit in the converter chamber are mechanically, but also thermally decoupled from one another. The connection of the separate components is of course designed to be pressure-resistant and gas-tight. Due to the reduced oil volume, the measurement error caused by the temperature gradient is correspondingly lower. Furthermore, due to the lower oil requirement, smaller separating membranes and overload membranes are also possible, which is important and advantageous for the realization of a coplanar sensor. Small membranes in turn are required for effective overload protection, since small measurement ranges are made possible thereby. As a result of small measurement ranges, the actuation or the deflection of the membranes can be kept small, which is accompanied by smaller measurement errors.

In general, it can be said that, in order to protect the pressure-sensitive element against overpressure, it is ensured according to the invention that an overpressure occurring on one side on the coplanar double membrane system is limited when the pressure-sensitive element is reached in such a way that destruction of the pressure-sensitive element is precluded.

According to one embodiment of the differential pressure sensor according to the invention, the additional membranes are preloaded in such a way that they bear against the base body of the measuring unit over their entire area during normal measuring operation and only lift off from the base body when a predetermined critical limit pressure is exceeded. This ensures that the overload protection or overpressure protection is activated only when the pressure to be measured is so high that there is a risk of destruction of the pressure-sensitive element. A process membrane/separating membrane that can be used, inter alia, in conjunction with the solution according to the invention, is described, for example, in U.S. Pat. No. 10,656,039 B2.

Owing to the overload membranes bearing against the measuring unit substantially over their entire area, preferably in a form-fitting manner, the measurement pressure passes via the pressure chambers and the correspondingly coupled connecting capillaries to the corresponding additional pressure chamber and to the plus or the minus side of the pressure-sensitive element. At least one hydraulic duct may be provided in the membrane beds and/or in the corresponding rear sides of the overload membranes. As a result of their preloading, the deflection of the overload membranes is necessarily prevented up to a predetermined value or is so small that it is negligible. The preloading is designed to be greater than the measurement range of the differential pressure sensor. In particular, it is ensured that this condition also applies over the lifetime of the differential pressure sensor. Therefore, aging effects cannot have a negative effect on the measurement performance.

The preloading of the overload membranes ensures that they are only deflected when a critical overpressure, which would cause the risk of destruction of the pressure-sensitive element, occurs at one of the double membranes. As soon as a critical overpressure occurs at the second separating membrane, for example, the second separating membrane is moved toward the second overload membrane until it bears against the overload membrane. When the preloading of the first overload membrane is exceeded, the latter is deflected, and the transfer fluid pushed out of the second pressure chamber is displaced via the coupled connecting capillaries into the first additional pressure chamber. The pressure in the first additional pressure chamber and in the first pressure chamber operatively connected thereto rises. This process ends when the hydraulic fluid is displaced from the high-pressure side to the low-pressure side. Subsequently, the hydraulic pressure in the hydraulic system can no longer rise, and the pressure limitation, that is to say the overpressure protection, takes effect.

An advantageous embodiment of the differential pressure sensor according to the invention provides for the overload membranes to be preloaded in such a way that they substantially bear against the base body of the measuring unit during normal measuring operation. The entire area of the rear side of the overload membranes is in contact with the base body of the measuring unit. Therefore, if an overpressure occurs, only the transfer fluid located in the pressure chamber of the high-pressure side has to be moved and displaced into the additional pressure chamber of the low-pressure side. In this way, the required quantity of transfer fluid in the hydraulic system can be minimized or kept low, with optimally fast-acting overload protection. When an overpressure endangering the pressure-sensitive element is exceeded, the separating membrane is pressed firmly against the overload membrane bearing against the base body on the high-pressure side; on the low-pressure side, the preloading of the overpressure membrane is overcome, so that the overload membrane is lifted off the base body, the separating membrane is deflected, and the transfer fluid displaced from the high-pressure side is received in the additional pressure chamber formed on the low-pressure side.

In addition, it is proposed for the measuring unit to be an integral component of a process connection constructed substantially symmetrically. The converter chamber with the pressure-sensitive element is integrated in a housing adapter that can be connected to the process connection.

In a cost-effective embodiment, the capillary connections are designed as capillary bores. In the event that the measuring unit and the converter chamber are offset from one another, capillary tubes can be provided in the intermediate region, which are inserted into the capillary bores of the measuring unit and the converter chamber. Alternatively, an intermediate module with capillary bores can ensure the connection of the capillary connections of the measuring unit and the converter chamber.

The number, arrangement and coupling of the capillary connections is dimensioned or designed in such a way that the pressure-sensitive element and the overload membranes serving for overpressure protection or the additional pressure chambers are connected in series in terms of pressure dynamics. Alternatively, provision is made for the number, arrangement and coupling of the capillary connections to be dimensioned or designed in such a way that the pressure-sensitive element and the overload membranes serving for overpressure protection or the additional pressure chambers are connected in parallel in terms of pressure dynamics.

The couplings/connections of the connecting capillaries for the purpose of overpressure protection can be arranged at different locations:
 in the measuring unit,
 in the intermediate region or in an intermediate module of the measuring unit and the converter chamber,
 partially in the intermediate region/intermediate module of the measuring unit and the converter chamber and partially in the converter chamber,
 in the converter chamber,
 in the rear space of the converter chamber, that is to say virtually behind the converter chamber.

BRIEF DESCRIPTION OF THE DRAWINGS

The invention is explained in greater detail with reference to the following figures. The following is shown:

FIG. 3a and FIG. 3b show a third embodiment of the differential pressure sensor according to the present disclosure with a parallel connection of the overload protection;

DETAILED DESCRIPTION

Figure 1B:
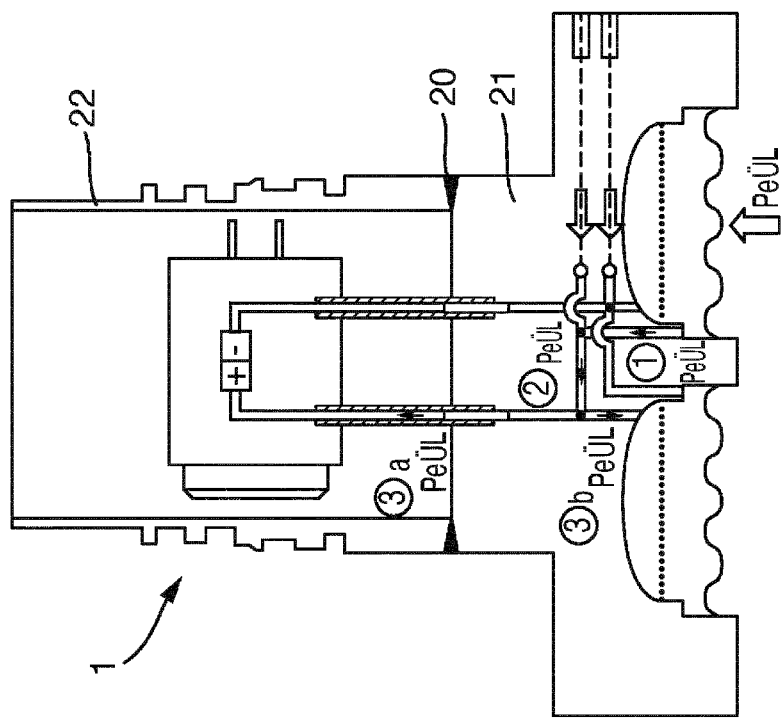
FIG. 1a and FIG. 1b show a first embodiment of the differential pressure sensor according to the present disclosure with a parallel connection of the overload protection.
Figure 1A:
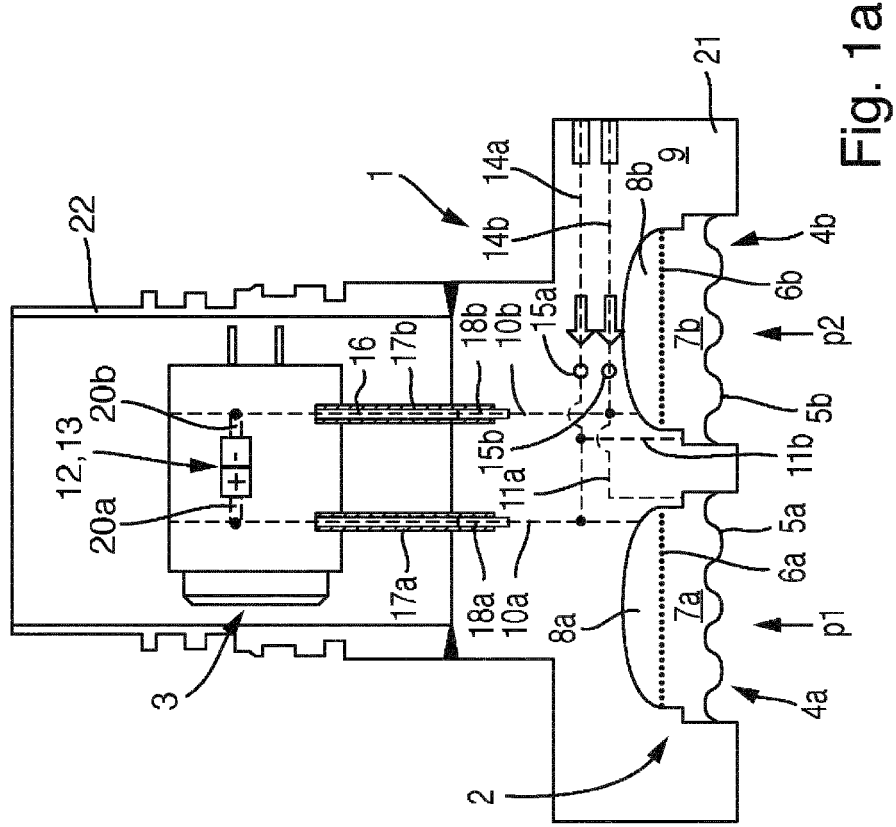

FIGS. 1a and 1b show a first embodiment of the differential pressure sensor according to the invention with a parallel connection of the overload protection. The differential pressure sensor 1 serves to determine the differential pressure between two pressures p1, p2. The measurement of the differential pressure between two pressures p1, p2 is used for example in a pipe conduit to determine flow. A further application of a differential pressure sensor 1 is, for example, the determination of the fill level of a fluid medium located in a tank.

The differential pressure sensor 1 consists of a measuring unit 2 and a converter chamber 3. A coplanar double membrane system with two double membranes 4a, 4b is provided on or in an end region of the measuring unit 2 facing the process. The measuring unit 2 is arranged in the process connection 21. A differential pressure measuring cell 12 with a pressure-sensitive element 13 is arranged in the converter chamber 3. The converter chamber 3 is located in the housing adapter 22. In the case shown, the converter chamber 3 and the measuring unit 2 are offset from one another.

The two double membranes 4a, 4b each consist of a process membrane 5a, 5b or a separating membrane 5a, 5b and an overload membrane 6a, 6b arranged behind the separating membrane 5a, 5b in the direction of action of the pressure. A first pressure chamber 7a is formed between the first separating membrane 5a and the first overload membrane 6a, and a first additional pressure chamber 8a or overpressure chamber 8a is formed between the first overload membrane 6a and the base body 9. Furthermore, a second pressure chamber 7b is formed between the second separating membrane 5b and the second overload membrane 6b, and a second additional pressure chamber 8b or a second overpressure chamber 8b is formed between the second overload membrane 6b and the base body 9.

A first connecting capillary 10a is assigned to the first additional pressure chamber 8a, and a second connecting capillary 10b is assigned to the second additional pressure chamber 8b. A first auxiliary capillary 11a is assigned to the first pressure chamber 7a. A second auxiliary capillary 11b is assigned to the second pressure chamber 7b. The pressure-transmitting coupling/intersection between the first auxiliary capillary 11a and the second connecting capillary 10b and between the second auxiliary capillary 11b and the first connecting capillary 10a takes place in the measuring unit 2 in this embodiment.

The pressure transfer and the limitation of the overpressure to an amount by which the pressure-sensitive element 13 is not damaged or destroyed, operate in parallel, wherein it is ensured in terms of pressure dynamics that the overpressure PeÜL is limited before it reaches the pressure measuring cell 12. The limitation of the overpressure PeÜL takes place via a correspondingly predetermined preloading of the overload membranes 6a, 6b. These are preloaded in such a way that in normal measuring operation they bear against the housing of the base body 9 in a substantially form-fitting manner and only lift off from the base body 9 when the predetermined critical limit pressure is exceeded. Up to this limit pressure, integrity of the pressure-sensitive element is ensured.

The overload or overpressure situation is shown. In the case shown, an overpressure PeÜL occurs on one side at the right separating membrane 5b. Without the protective device according to the invention, the overpressure PeÜL would be transmitted to the pressure-sensitive element 13. Due to the one-sided overload, there would be a risk of the silicon chip being destroyed.

According to the invention, this risk is eliminated by a bypass. The bypass consists of the auxiliary capillaries 11a, 11b, which intersect with the connecting capillaries 10a, 10b in the measuring unit 2 and guide the pressure or an occurring overpressure to the rear side of the overload membranes 6a, 6b. The path that the overpressure PeÜL takes through the capillary system is symbolized in FIG. 1b by arrows: The overpressure PeÜL is transmitted hydraulically via the auxiliary capillary 11b to the connecting capillaries 10a and from there to the rear side of the overload membrane 6a of the first double membrane 4a.

If an overpressure PeCL occurs at the right separating membrane 5b, the overpressure PeÜL is transmitted via the pressure chamber 7b to the overload membrane 6b. Since the latter already bears against the housing 9, the pressure does not reach the pressure-sensitive element 13 via the connecting capillary 10b. The overpressure PeÜL is conducted via the pressure chamber 7b, the auxiliary capillary 11b, the connecting capillary 10a, the additional pressure chamber 8a and the overload membrane 6a to the pressure chamber 7a. The overload membrane 6a and the separating membrane 5a are deflected, and the additional pressure chamber 8a and the pressure chamber 7a receive the transfer fluid 16 displaced from the high-pressure side 4b until the separating membrane 5b bears on the overpressure membrane 6b. A further pressure increase is then no longer possible. In parallel, the pressure, which is always below the critical limit value, is also applied to the plus side of the pressure-sensitive element 13.

In order to have even greater security that the overpressure is limited before it reaches the sensitive region of the pressure chip (usually also a membrane), the connecting capillaries 10a, 10b, like the auxiliary capillaries 11a, 11b, preferably have correspondingly adapted capillary geometries that fulfill a braking function in the direction of the pressure-sensitive chip 13. In particular, the connecting and auxiliary capillaries 10a, 10b, 11a, 11b usually designed as bores in the measuring unit 2 and in the converter chamber 3 are dimensioned suitably in length and diameter. In the case shown, upstream dynamic brakes 18a, 18b and optionally 20a, 20b are additionally provided. These are preferably arranged in the capillary tubes 17a, 17b, which open into the capillary bores 10a, 10b of the measuring unit 2. Additionally or alternatively, dynamic brakes 20a, 20b are used in the connecting capillaries 10a, 10b of the converter chamber 3. Said brakes slow the transfer of the pressure, in particular of an overpressure PeÜL, but also protect the pressure-sensitive element 13 from pressure peaks occurring in the process.

The dynamic brakes 18a, 18b, 20a, 20b can be sintered metal inserts. If the differential pressure sensor 1 is used in potentially explosive areas, the dynamic brakes 18a, 18b, 20a, 20b are made of a non-conductive material. In this case, the dynamic brakes 18a, 18b, 20a, 20b then fulfill a dual function: A decelerated transfer of the pressure and an explosion protection that is designed according to the required explosion protection type.

Figure 2A:
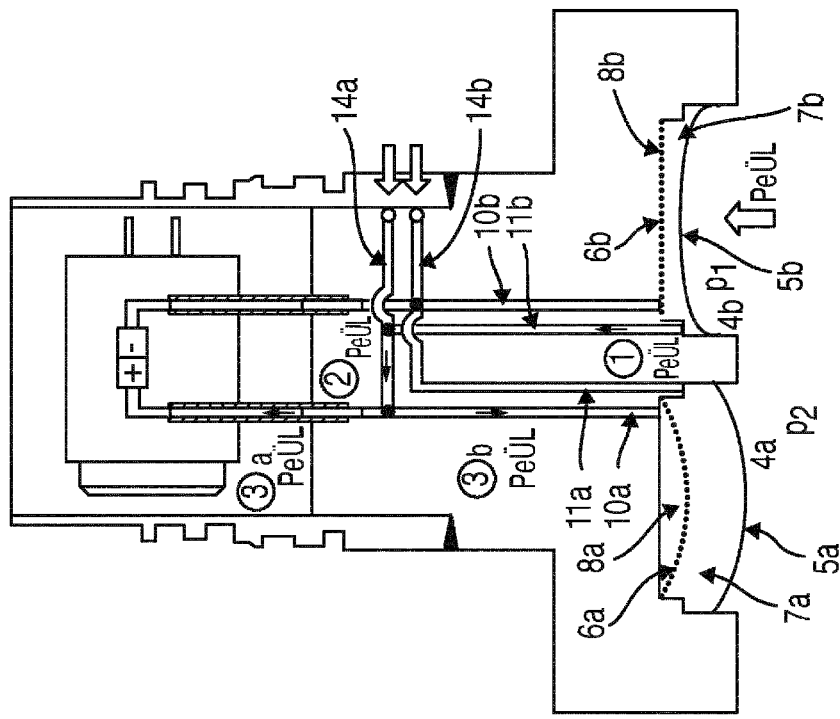
FIG. 2a and FIG. 2b show a second embodiment of the differential pressure sensor according to the present disclosure with a parallel connection of the overload protection.
Figure 2B:
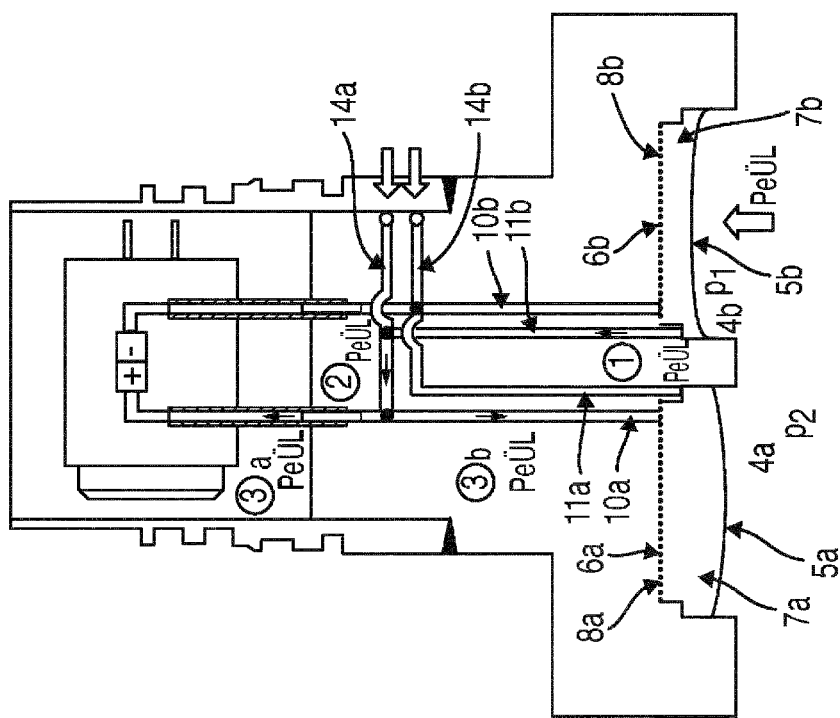

The variant shown in FIGS. 2a and 2b corresponds largely to the embodiment of the differential pressure sensor 1 shown in FIGS. 1a and 1b. The essential difference is the arrangement of the filling bores 14a, 14b. The capillary system or the hydraulic system of the differential pressure sensor 1 is filled with transfer fluid 16 via these filling bores 14a, 14b. The filling bores 14a, 14b run laterally in the process connection 21 or in the measuring unit 2. In the embodiments shown, the filling bores 14a, 14b run parallel to the base face of the process connection 21. The position is selected such that the oil volume required for filling is as low as possible.

For this reason, the closure elements 15a, 15b are also provided as close as possible to the intersection points of the capillaries 10a, 10b, 11a, 11b. This embodiment is also clearly visible in FIGS. 1a and 1b. The embodiment is preferred in which the closed filling bores 14a, 14b end in the sensor rear space and there preferably within the housing adapter 22 (FIG. 2a, FIG. 2b). Due to this arrangement in the interior of the differential pressure sensor 1, the filling bores 14a, 14b, behind the closure elements 15a, 15b, are corrosion-protected. Furthermore, the corresponding regions of the filling bores 14a, 14b can also be potted to the outside, but this is not absolutely necessary due to the position of the filling bores 14a, 14b, which is closed off from the outside, in the embodiment shown in FIG. 2.

A preferably spherical closure element 15a, 15b, which is pressed into the filling bore 14a, 14b and is subsequently caulked, is provided in each case as a pressure-tight, gas-tight or at least liquid-tight closure. In principle, other methods for closing the openings are also available. However, welding is viewed critically in this respect, since negative effects on the defined properties of the transfer fluid 16 can occur as a result of the temperature increase.

During regular measuring operation, the overload membranes 6a, 6b bear against the base body 9 of the measuring unit 2 over their entire area. The bearing is largely form-fitting; the overload membranes 6a, 6b are preloaded accordingly. The measurement pressure p1, p2 passes via the separating membranes 5a, 5b, the pressure chambers 7a, 7b, the connecting capillaries 10a, 10b and the auxiliary capillaries 11a, 11b to the rear side of the additional pressure chambers 8a, 8b and parallel to the converter chamber 3 or to the pressure-sensitive measuring element 13.

The overload membranes 6a, 6b and the measuring element 13 are hydraulically parallel, and therefore the same pressure acts on both. At the overload membranes 6a, 6b and the measuring element 13, the differential pressure dp is formed from $p_1$-$p_2$. The pressure-sensitive measuring element 13 is deflected as a function of the differential pressure. Since the overload membranes 6a, 6b are preloaded, their deflection is necessarily prevented up to a defined value. Of course, the preloading is also greater than the measurement range.

The pressure-sensitive measuring element 13 receives the pressure information for the plus side (+) via the pressure chamber 7b and the connecting capillaries 11b, 10a. The pressure information for the minus side (−) of the pressure-sensitive measuring element 13 is transmitted via the pressure chamber 7a and the connecting capillaries 11a, 10b. The effect of the parallel paths via the additional pressure chambers 8a, 8b is virtually negligible due to the preloaded and the approximately form-fitting support of the overload membranes 6a, 6b on the base body 9 of the measuring unit 2.

In the event of an overload, i.e. when a one-sided overpressure PeÜL occurs on the right side of the differential pressure sensor 1 at the separating membrane 5b, the pressure in the pressure chamber 7b rises. Since the overload membrane 6b rests against the base body 9, a pressure increase in the additional pressure chamber 8b is not possible. The pressure passes via the pressure chamber 7b, the connecting capillary 11b to the node point ② and acts via the connecting capillary 10a on the plus side (+) of the pressure-sensitive measuring element 13 and in parallel on the rear side of the overload membrane 6a facing away from the process. If the pressure exceeds the preloading of the overload membrane 6a, the latter is deflected, and the additional pressure chamber 8a can receive the oil 16 that is displaced out of the pressure chamber 7b. The pressure in the additional pressure chamber 8a and the subsequent pressure chamber 7a rises continuously. The overload membrane 6a and the separating membrane 5a are deflected in the direction of the process. This procedure ends only when all oil 16 is displaced out of the pressure chamber 7b, and the separating membrane 5b comes to rest on the overload membrane 6b supported on the base body 9 of the measuring unit 2. As soon as this state has been reached, the pressure in the interior of the hydraulic system cannot increase further: The pressure limitation, i.e. the overload protection, takes effect.

FIGS. 3a and 3b show a third embodiment of the differential pressure sensor according to the invention with a parallel connection of the overload protection. The essential difference from the solution described in FIG. 2a or FIG. 2b lies in the arrangement of the connections/intersections of connecting and auxiliary capillaries 10a, 10b, 11a, 11b. These connections/intersections are designed in a separate component, an intermediate module 19, as transverse bores. As a result, the measuring unit 2 can be designed fully symmetrically. Further details on this embodiment can be found in the corresponding patent application by the applicant filed on the same date. These are explicitly to be included in the disclosure content of the present application.

Figure 4:
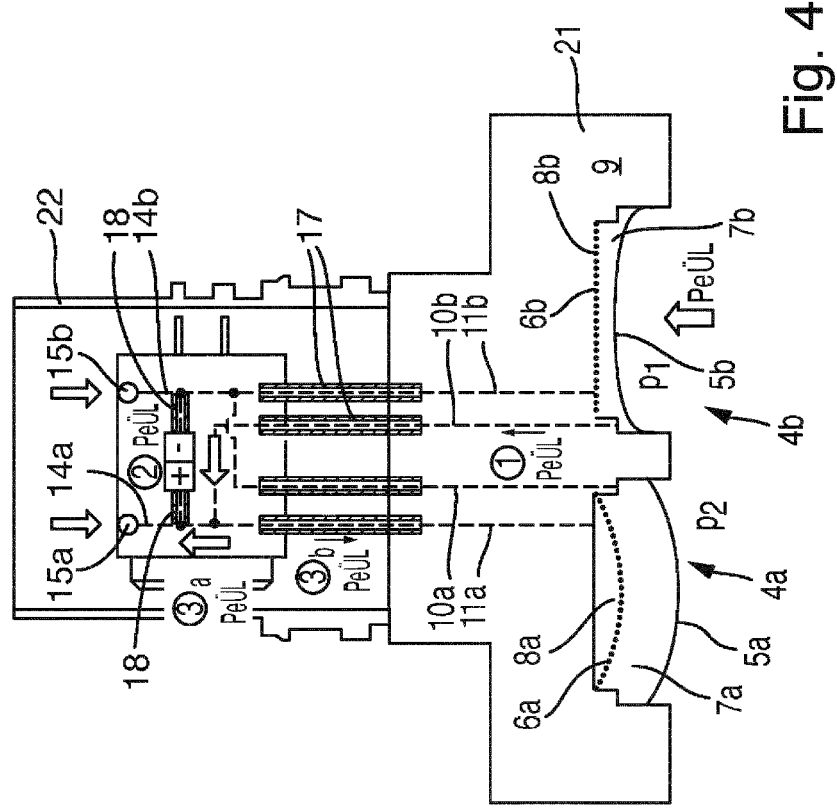
FIG. 4 shows a fourth embodiment of the differential pressure sensor according to the present disclosure with a parallel connection of the overload protection.

FIG. 4 shows a fourth embodiment of the differential pressure sensor according to the invention with a parallel connection of the overload protection. The operating principle of the overload protection corresponds to the solutions mentioned above. The arrangement of the connections/intersections of the connecting and auxiliary capillaries 10a, 10b, 11a, 11b here takes place in the converter chamber 3. The filling bores 14a, 14b are provided in the converter chamber 3. Here too, the measuring unit is designed to be fully symmetrical. Further details on this embodiment can be found in the corresponding patent application by the applicant filed on the same date. These are explicitly to be included in the disclosure content of the present application.

Figure 5:
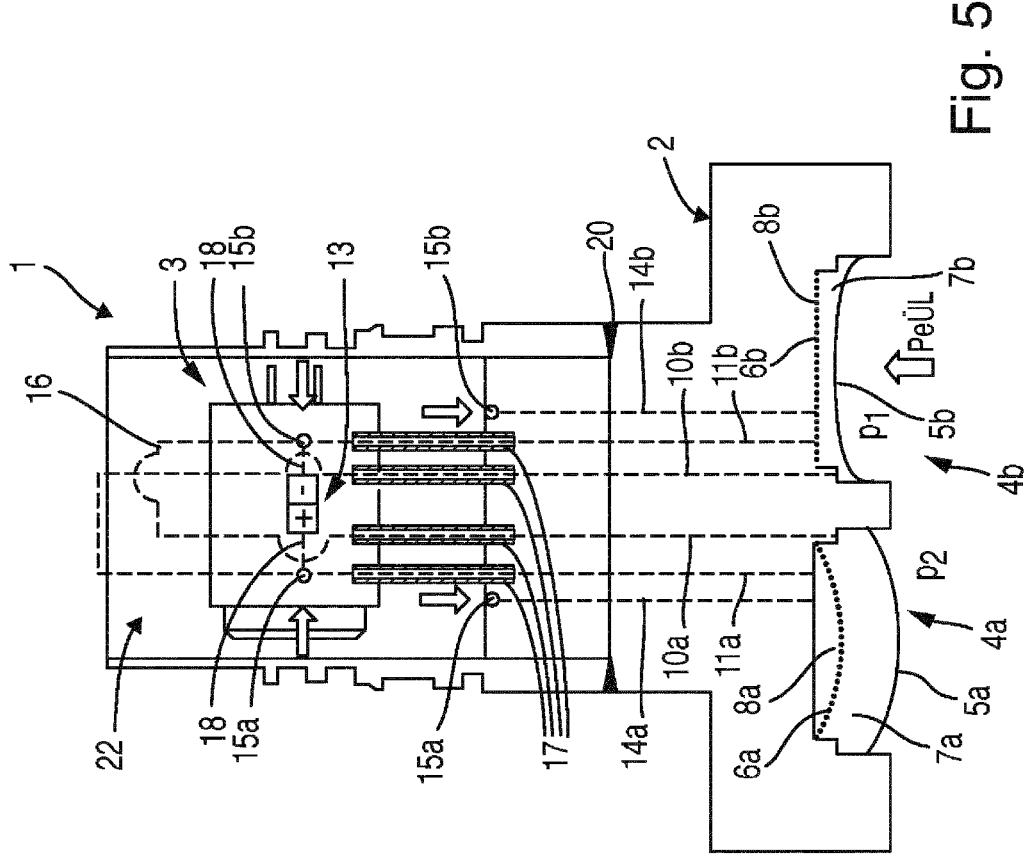
FIG. 5 shows a fifth embodiment of the differential pressure sensor according to the present disclosure with a parallel connection of the overload protection.

FIG. 5 shows a fifth embodiment of the differential pressure sensor according to the invention with a parallel connection of the overload protection. The operating principle of the overload protection corresponds to the solutions mentioned above. In this case, the connections/intersections of the connecting and auxiliary capillaries 10a, 10b, 11a, 11b are arranged in the rear space of the converter chamber 3. The filling bores 14a, 14b are provided either in the measuring unit 2 or in the converter chamber 3. A combination of both arrangements is also possible. Here too, the measuring unit is designed to be fully symmetrical. Further details on this embodiment can be found in the corresponding patent application by the applicant filed on the same date. These are explicitly to be included in the disclosure content of the present application.

Figure 6:
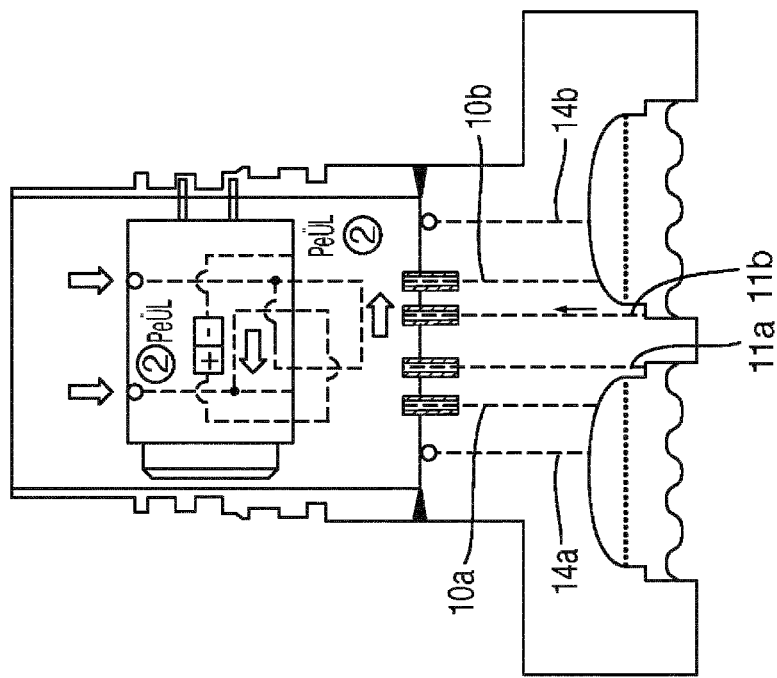
FIG. 6 shows a sixth embodiment of the differential pressure sensor according to the present disclosure with a parallel connection of the overload protection.

FIG. 6 shows a sixth embodiment of the differential pressure sensor according to the invention with a parallel connection of the overload protection. The operating principle of the overload protection corresponds to the solutions mentioned above. In this case, the connections/intersections of the connecting and auxiliary capillaries 10a, 10b, 11a, 11b are arranged partially in the converter chamber 3 and partially in the prechamber of the converter chamber 3. The filling bores 14a, 14b are provided in the converter chamber 3. Here too, the measuring unit is designed to be fully symmetrical.

Figure 7B:
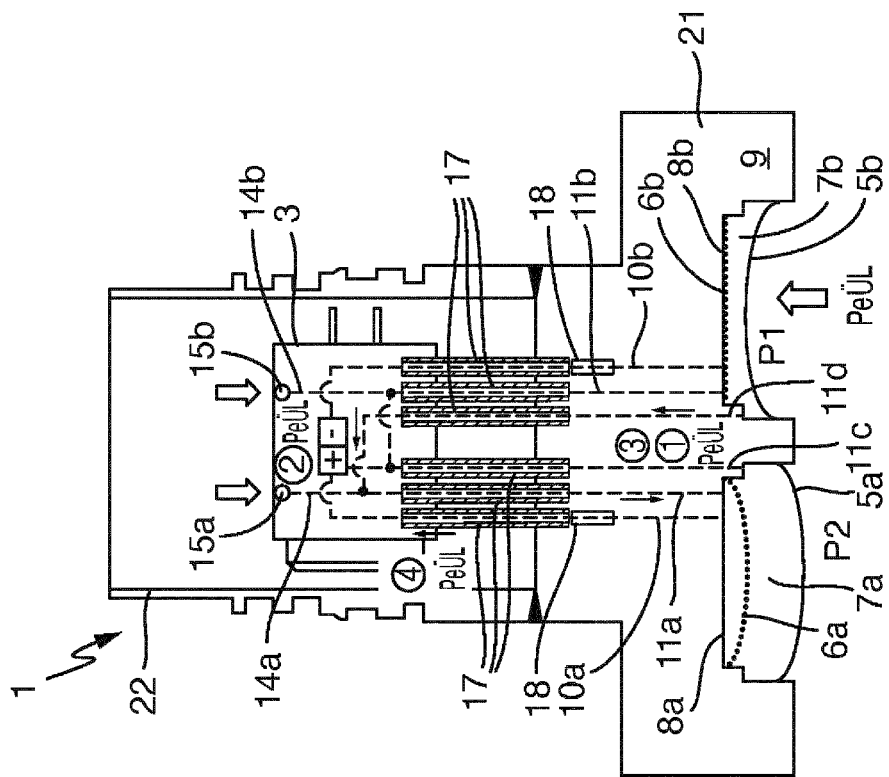
FIG. 7a and FIG. 7b show a first embodiment of the differential pressure sensor according to the present disclosure with a series connection of the overload protection.
Figure 7A:
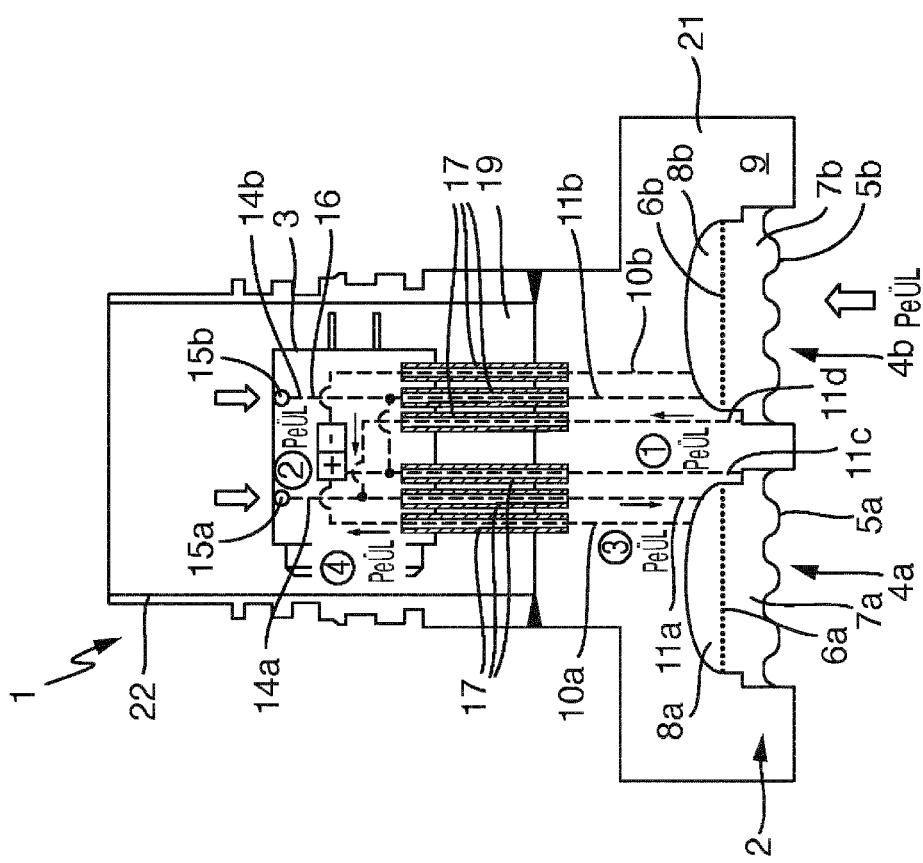

FIGS. 7a and 7b show sketches of the course of the connecting capillaries 10a, 10b and of the auxiliary capillaries 11a, 11b, 11c, 11d in an embodiment of the differential pressure sensor 1 according to the invention with overload protection connected in series. The double membranes 4a, 4b are located in the measuring unit 2; the differential pressure measuring cell 12 with the pressure-sensitive element 13 is located in the converter chamber 3.

Each of the two double membranes 4a, 4b is composed of a separating membrane 5a, 5b and an overload membrane 6a, 6b arranged behind the separating membrane 5a, 5b in the usual direction of action of the pressure. A first pressure chamber 7a is formed between the first separating membrane 5a and the first overload membrane 6a, and a first additional pressure chamber 8a is formed between the first overload membrane 6a and the base body 9.

A second pressure chamber 7b is formed between the second separating membrane 5b and the second overload membrane 6b, and a second additional pressure chamber 8b is formed between the second overload membrane 6b and the base body 9. The overload membranes 6a, 6b are preferably preloaded in such a way that, during normal measuring operation, they bear against the base body 9 of whatever shape in a form-fitting manner and over their entire area and only lift off from the base body 9 when a predetermined critical limit pressure is exceeded. If the critical limit pressure is exceeded, there is a risk of the membrane of the pressure-sensitive element 13 being destroyed and the differential pressure sensor 1 becoming inoperative.

A first connecting capillary 10a is assigned to the first additional pressure chamber 8a, and a second connecting capillary 10b is assigned to the second additional pressure chamber 8b. The pressure is transmitted hydraulically to the differential pressure cell 12 in the converter chamber 3 via the two connecting capillaries 10a, 10b. As protection of the pressure-sensitive element 13 from a one-sided overpressure, a first auxiliary capillary 11a is assigned to the first additional pressure chamber 8a, and a second auxiliary capillary 11b is assigned to the second additional pressure chamber 8b. A third auxiliary capillary 11c is assigned to the first pressure chamber 7a, and a fourth auxiliary capillary 11d is assigned to the second pressure chamber 7b. For hydraulic coupling, the first auxiliary capillary 11a is connected to the fourth auxiliary capillary 11d, and the second auxiliary capillary 11b is connected to the third auxiliary capillary 11c, wherein the connection points or intersections in this case are arranged in the converter chamber 3.

In normal measuring operation, the pressure p1 is transmitted via the separating membrane 5a, the auxiliary capillary 11c, the auxiliary capillary 11b and the connecting capillary 10b to the minus side of the pressure-sensitive element 13. The pressure p2 is transmitted via the separating membrane 5b, the auxiliary capillary 11d, the auxiliary capillary 11a and the connecting capillary 10a to the plus side of the pressure-sensitive element 13. If the overload membranes 6a, 6b bear against the base body 9 of the measuring unit 2 in a form-fitting manner and over their entire area, a hydraulic duct is optionally made in the overload membranes 6a, 6b or in the two membrane beds.

It is shown by means of arrows how, in the event of an overload or an overpressure, the overpressure PeÜL is transmitted in the capillary system. In the case shown, an overpressure PeÜL occurs on the high-pressure side at the separating membrane 5b. If a one-sided overpressure PeÜL occurred at one of the membranes of the pressure-sensitive element 13, there would be a risk of the pressure-sensitive element 13, which is usually a silicon chip, being destroyed. According to the invention, this risk is eliminated in that the overpressure protection is activated before the overpressure PeÜL reaches the pressure-sensitive element 13. The overpressure PeÜL present at the separating membrane 5b is transmitted from the pressure chamber 7b via the additional membrane 6b to the additional pressure chamber 8b and ultimately brings the separating membrane 5b to bear on the overload membrane 6b already bearing against the base body 9 of the measuring unit 2. Any transfer fluid still present in the additional pressure chamber 8b is pressed out. Subsequently, transfer fluid 16 can no longer be displaced; the one-sided overpressure PeÜL is not transmitted to the minus side (−) of the pressure-sensitive element 13. Furthermore, the overpressure PeÜL is guided in the bypass via the separating membrane 5b, the pressure chamber 7b, the auxiliary capillary 11d and the auxiliary capillary 11a to the additional pressure chamber 8a and from there to the overload membrane 6a. The preloaded overload membrane 6a is lifted from its bed in the base body 9 and transfers the overpressure PeÜL to the pressure chamber 7a and to the separating membrane 5a. As a result of the deflection of the overload membrane 6a and the separating membrane 5a, the hydraulic transfer fluid 16 pressed out of the high-pressure side can be received in the pressure chamber 7a and the additional pressure chamber 8a.

Transfer fluid 16 is transferred from the high-pressure side of the double membrane system 4b to the low-pressure side of the double membrane system 4a until no more transfer fluid 16 can be displaced on the high-pressure side, since the separating membrane 5b bears against the overload membrane 6b supported on the base body of the measuring unit 2. The maximum pressure present on the plus side (+) of the pressure-sensitive element 15 can be defined or dimensioned via the restoring force of the overload membrane 6a, 6b (spring in the deflected state). Thus, destruction of the pressure-sensitive element 13, usually a silicon chip, is effectively counteracted.

In order to ensure that the overpressure PeÜL first deflects the overload membrane 6a before it reaches the membrane of the pressure-sensitive element 13, the hydraulic paths are routed in series in the solution according to the invention. The pressure-sensitive chip 13 is located at the end of the series connection. This is assisted or ensured by correspondingly adapted capillary geometries that fulfill a braking function in the direction of the pressure-sensitive chip.

Additionally or alternatively, dynamic brakes 18 upstream of the pressure-sensitive element 13 can also be provided. In particular, the connecting capillaries 10a, 10b and the auxiliary capillaries 11a, 11b, 11c, 11d are suitably dimensioned in length and diameter, so that the function of the overload protection can reliably take effect.

According to a development of the differential pressure sensor 1 according to the invention, it is considered advantageous if so-called dynamic brakes 18 are used additionally or alternatively in the connecting capillaries 10a, 10b. Said brakes slow the transfer of the pressure, in particular of an overpressure PeÜL, and in particular also protect the pressure-sensitive element 13 from pressure peaks occurring in the process. The dynamic brakes 18 can be sintered metal inserts. If the differential pressure sensor 1 is used in explosion-proof areas, the dynamic brakes are made of a non-conductive material. In this case, the dynamic brakes 18 then fulfill a dual function: Decelerated transfer of the pressure and explosion protection according to a required explosion protection type.

Figure 8B:
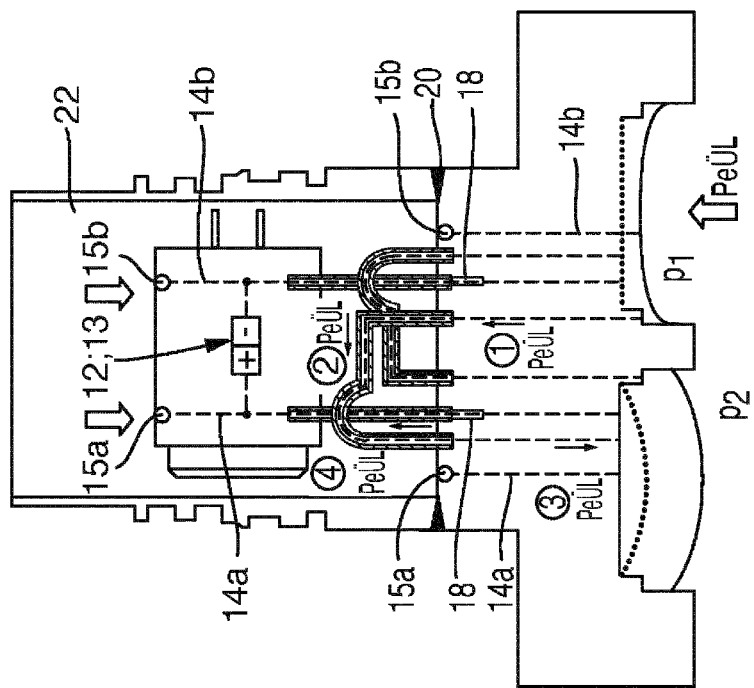
FIG. 8a and FIG. 8b show a second embodiment of the differential pressure sensor according to the present disclosure with a series connection of the overload protection.
Figure 8A:
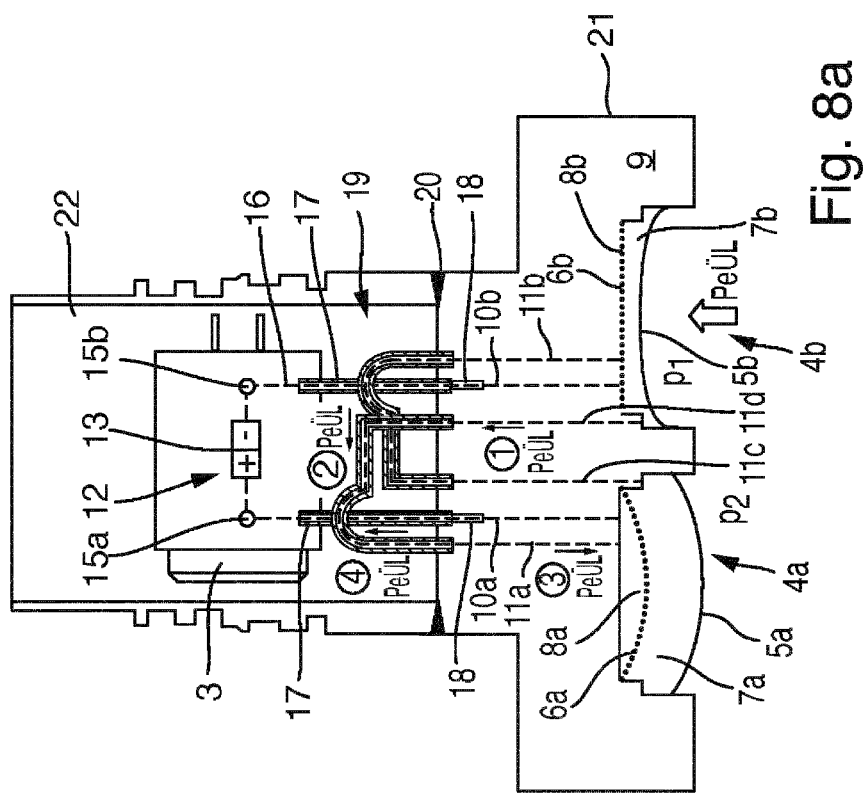

The embodiment shown in FIG. 8 of a differential pressure sensor with overload protection connected in series functions in the same way as the previously described embodiment. However, the intersections/connections of the auxiliary capillaries take place in the space in front of the converter chamber 3, optionally in a separate intermediate module 19. Here too, the measuring unit is designed to be fully symmetrical. Further details on this embodiment can be found in the corresponding patent application by the applicant filed on the same date. These are explicitly to be included in the disclosure content of the present application.

The invention claimed is:

1. A differential pressure sensor for determining the differential pressure between two pressures in a process, the sensor comprising:
   a converter chamber including a differential pressure measuring cell including a pressure-sensitive element disposed in the converter chamber; and
   a measuring unit comprising:
      a base body including an end portion configured to face the process; and
      a coplanar double-membrane system disposed in the end portion of the base body and including a first double membrane and a second double membrane,
      wherein each double membrane comprising a separating membrane and an overload membrane arranged behind the separating membrane relative to a direction of action of pressure from the process,
      wherein a first pressure chamber is defined between a first separating membrane and a first overload membrane of the first double membrane, and a first additional pressure chamber is defined between the first overload membrane and the base body of the measuring unit,
      wherein a second pressure chamber is defined between a second separating membrane and a second overload membrane of the second double membrane, and a second additional pressure chamber is defined between the second overload membrane and the base body of the measuring unit,
      wherein each of the first and second pressure chambers is connected to a corresponding capillary connection, and each of the first and second additional pressure chambers is connected to at least one further capillary connection,
      wherein each capillary connection is configured and coupled such that pressures present at the first and second separating membranes are hydraulically transmitted to the pressure-sensitive element during normal measuring operation and such that,
      when an overpressure is present at the first separating membrane or second separating membrane, thereby defining a high-pressure side and a low-pressure side, respectively, the overpressure is hydraulically transmitted from the high-pressure side to the low-pressure side via a hydraulic fluid such that the first or second overload membrane and the first or second separating membrane corresponding to the low-pressure side are deflected, and hydraulic fluid displaced from the high-pressure side is received in the respective first or second additional pressure chamber of the low-pressure side before the overpressure acts upon the pressure-sensitive element, wherein the base body of the measuring unit is configured as a single piece and has a substantially fully symmetrical construction, at least relative to the coupling of the capillary connections, with respect to a plane extending centrally and perpendicularly between the first double membrane and the second double membrane of the coplanar double-membrane system, wherein the first and second overload membranes are preloaded such that each bears against the base body of the measuring unit in a substantially form-fitting manner during normal measuring operation and such that, only when an overpressure endangering the pressure-sensitive element is exceeded, the first overload membrane corresponding to the low-pressure side is lifted off the base body due to the overpressure, while the second overload membrane on the high-pressure side is pressed against the base body.

2. The sensor of claim 1, wherein the measuring unit is an integral component of a substantially symmetrically constructed process connection, and wherein the converter chamber is integrated in a housing adapter connected to the process connection.

3. The sensor of claim 1, wherein the capillary connections are configured as capillary bores and/or as capillary tubes.

4. The sensor of claim 1, wherein a number, arrangement and coupling of the capillary connections is configured such that the pressure-sensitive element and the first and second overload membranes configured for overpressure protection are connected hydraulically in series.

5. The sensor of claim 1, wherein a number, arrangement and coupling of the capillary connections is configured such that the pressure-sensitive element and the first and second overload membranes configured for overpressure protection are connected hydraulically in parallel such that a same pressure acts on the pressure-sensitive element and the first and second overload membranes.

6. The sensor of claim 1, wherein coupling of the connecting capillaries to enable overpressure protection is provided in the measuring unit.

7. The sensor of claim 1, wherein coupling of the connecting capillaries to enable overpressure protection is provided in an intermediate region of the measuring unit and the converter chamber, or partially in the intermediate region of the measuring unit and the converter chamber and partially in the converter chamber.

8. The sensor of claim 1, wherein coupling of the connecting capillaries to enable overpressure protection is provided in the converter chamber or in a rear region of the converter chamber.

* * * * *